United States Patent Office 3,714,252
Patented Jan. 30, 1973

3,714,252
SUBSTITUTED ACID ANILIDES
Hans Kiefer, Wachenheim, and Adolf Fischer, Mutterstadt, Germany, assignors to Badische Anilin- & Soda-Fabrik Aktiengesellschaft, Ludwigshafen (Rhine), Germany
No Drawing. Filed Oct. 26, 1970, Ser. No. 84,159
Claims priority, application Germany, Oct. 30, 1969,
P 19 54 547.2
Int. Cl. C07c 103/32, 103/38
U.S. Cl. 260—562 R    2 Claims

ABSTRACT OF THE DISCLOSURE

New and valuable substituted acid anilides and a process for controlling the growth of unwanted plants with these compounds.

---

The present invention relates to new and valuable substituted acid anilides and herbicides containing them.

It is known to use substituted acid anilides, e.g. propionyl-3',4'-dichloroanilide (DAS 1,039,779) as herbicides; however, their compatibility with crop plants is not always satisfactory.

We have now found that substituted acid anilides of the formula

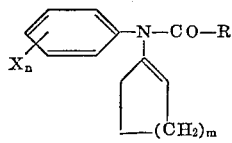

where R denotes alkyl or alkenyl having from 2 to 6 carbon atoms (ethyl, 2-isopropenyl, 2-pentyl, 2-methylpentyl), X denotes chlorine, methoxy and/or trifluoromethyl, $n$ denotes one of the integers 1 and 2, and $m$ denotes one of the integers 1, 2, 3, 4 and 8, have a good herbicidal action. The action is particularly in evidence when the active ingredients are used as selective herbicides in crop plants, such as rice.

The active ingredients may be prepared for example by reacting the appropriate substituted anils with the appropriate acid chlorides and a tertiary nitrogen base. It has proved to be advantageous to bring the acid chloride in an inert solvent to the reaction temperature and to add the anil to be used simultaneously with the tertiary nitrogen base.

The preparation of the compounds according to the invention is illustrated below with reference to N-(1-cyclohexenyl)-3',4'-dichloropropionaldehyde:

At 80° C. and over a period of 1 hour, a mixture of 242 parts of N-(1-cyclohexenyl)-3',4'-dichloroaniline and 152 parts of triethylamine is dripped into a stirred solution of III parts of propionyl chloride and 800 parts of toluene. The whole is stirred for a further 2 hours and the precipitated triethylamine hydrochloride is filtered with suction. From the filtrate there is obtained by distillation 242 parts (81% of the theory) of N-(1-cyclohexenyl)-3',4'-dichloropropionaldehyde as a colorless oil; B.P. (0.2 mm.): 153° C.

The other active ingredients may be prepared analogously.

Examples of other active ingredients are as follows:

N-(1-cyclohexenyl)-3',4'-dichloro-methacrylanilide;
N-(1-cyclohexenyl)-3'-chloro-4'-methyl-2-methyl-valeranilide;
N-(1-cyclohexenyl)-4'-chloro-2-dimethylvaleranilide;
N-(1-cyclohexenyl)-3'-chloro-4'-methoxy-propionanilide;
N-(1-cyclohexenyl)-3'-trifluoromethyl-propionanilide;
N-(1-cyclooctenyl)-3',4'-dichloro-propionanilide;
N-(1-cyclododecenyl)-3',4'-dichloro-propionanilide.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydronaphthalene or alkylated naphthalenes, or organic liquids having boiling points higher than 150° C. and having one or more than one functional group, e.g. the keto groups, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following example illustrates the use of the new active ingredients.

EXAMPLE 1

On an agricultural plot, the plants Oryza sativa, Echinochloa crus-galli, Digitaria sanguinalis, Setaria viridis and Setaria glauca are treated at a growth height of 3 to 20 cm. with 3 kg. per hectare of N-(1-cyclohexenyl)-3',4'-dichloropropionaldehyde (I) and, for comparison, with 3 kg. per hectare of propionyl-3',4'-dichloroanilide (II), these amounts each being dispersed with dispersant in 500 liters of water per hectare. After 3 to 4 weeks, it is ascertained that active ingredient I has a far superior crop plant compatibility to II combined with approximately the same good herbicidal action.

The results of the experiment are given in the following table:

|  | Active ingredient | |
|---|---|---|
|  | I | II |
| Oryza sativa | 0 | 15 |
| Echinochloa crus-galli | 90 | 90 |
| Digitaria sanguinalis | 85 | 80 |
| Setaria viridis | 80 | 80 |
| Setaria glauca | 80 | 80 |

NOTE.—0=No damage, 100=Complete destruction.

EXAMPLE 2

70 parts by weight of compound I is mixed with 30 parts by weight of N-methyl-α-pyrrolidone. A mixture is obtained which is suitable for application in the form of very fine drops.

EXAMPLE 3

20 parts by weight of compound I is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 4

20 parts by weight of compound I is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of compound I is dissolved in a mixture consisting of 25 parts by weight of cyclohexanol, 65 parts by weight of a mineral oil fraction having a boiling point between 210° C. and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound II is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 7

3 parts by weight of compound I is intimately mixed with 97 parts by weight of particulate kaolin. A dust is obtained containing 3% by weight of the active ingredient.

EXAMPLE 8

30 parts by weight of compound II is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted acid anilide of the formula

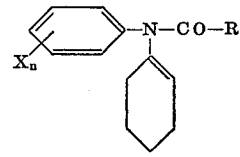

wherein R is alkyl or alkenyl of 2 to 6 carbon atoms, X is chlorine, methoxy or trifluoromethyl and $n$ is one of the integers 1 and 2.

2. N-(1-cyclohexenyl)-3',4'-dichloropropionanilide.

References Cited

UNITED STATES PATENTS 3,535,377  10/1970  Steinbrunn et al. _____ 260—562

HARRY I. MOATZ, Primary Examiner

U.S. Cl. X.R.

260—562 A, 574, 577; 71—118